United States Patent
Nankivell

(10) Patent No.: US 10,401,063 B2
(45) Date of Patent: Sep. 3, 2019

(54) SUBSYSTEM FOR A VAPOUR-COMPRESSION SYSTEM, A VAPOUR-COMPRESSION SYSTEM, AND A METHOD FOR A VAPOUR-COMPRESSION SYSTEM

(71) Applicant: Cresstec RAC IP Pty. Ltd., Annadale (AU)

(72) Inventor: Ian David Nankivell, Carlingford (AU)

(73) Assignee: CRESSTEC RAC IP PTY. LTD., Annandale, New South Wales (AU)

( * ) Notice: Subject to any disclaimer, the term of this patent is extended or adjusted under 35 U.S.C. 154(b) by 0 days.

(21) Appl. No.: 15/746,387

(22) PCT Filed: Jul. 18, 2016

(86) PCT No.: PCT/AU2016/000255
§ 371 (c)(1),
(2) Date: Jan. 19, 2018

(87) PCT Pub. No.: WO2017/011852
PCT Pub. Date: Jan. 26, 2017

(65) Prior Publication Data
US 2018/0195779 A1 Jul. 12, 2018

(30) Foreign Application Priority Data

Jul. 20, 2015 (AU) ............................... 2015902860
Jan. 11, 2016 (AU) ............................... 2016900063

(51) Int. Cl.
F25B 41/00 (2006.01)
F25B 41/04 (2006.01)
(Continued)

(52) U.S. Cl.
CPC ............ *F25B 41/003* (2013.01); *F25B 41/04* (2013.01); *F25B 41/06* (2013.01); *F25B 45/00* (2013.01);
(Continued)

(58) Field of Classification Search
CPC ........ F24F 1/24; F24F 1/22; F24F 1/00; F24F 1/26; F24F 1/46; F24F 1/20; F24F 1/50;
(Continued)

(56) References Cited

U.S. PATENT DOCUMENTS

2015/0052937 A1\* 2/2015 Hung ..................... F25B 45/00
62/498
2016/0091233 A1 3/2016 Chen et al.

FOREIGN PATENT DOCUMENTS

DE 10 2012 218 700 A1 4/2014
EP 0 617 782 A1 10/1994
(Continued)

OTHER PUBLICATIONS

Supplementary European Search Report dated Feb. 22, 2019 in related counterpart European Patent Application No. 16826913.2 (seven pages).

*Primary Examiner* — Emmanuel E Duke
(74) *Attorney, Agent, or Firm* — Kilpatrick Townsend & Stockton LLP

(57) ABSTRACT

There is disclosed herein a subsystem for a vapor-compression system having a compressor and a condenser. The subsystem includes a storage assembly fluidly communicable with a compressor inlet of the compressor for flow of refrigerant. The storage assembly is configured to receive and store refrigerant in a storing configuration, and release refrigerant stored therein to the compressor inlet of the compressor in a releasing configuration. The subsystem further includes a flow-directing assembly in fluid communication with the storage assembly for flow of refrigerant, and fluidly communicable with a condenser inlet of the condenser and a compressor outlet of the compressor for flow of refrigerant. The flow-directing assembly is configured to direct refrigerant from the compressor outlet to the storage assembly in a first flow configuration, and direct refrigerant from the compressor outlet to the condenser inlet in a second flow configuration.

12 Claims, 4 Drawing Sheets

(51) Int. Cl.
*F25B 45/00* (2006.01)
*F25B 41/06* (2006.01)

(52) U.S. Cl.
CPC ... *F25B 2345/001* (2013.01); *F25B 2345/002* (2013.01); *F25B 2345/003* (2013.01); *F25B 2500/23* (2013.01); *F25B 2500/24* (2013.01); *F25B 2600/2501* (2013.01); *F25B 2700/1931* (2013.01); *F25B 2700/21152* (2013.01); *F25B 2700/21174* (2013.01)

(58) Field of Classification Search
CPC ..... H05K 7/20936; F25D 17/06; F25D 23/00; F25D 23/003; F25B 31/006
See application file for complete search history.

(56) References Cited

FOREIGN PATENT DOCUMENTS

| | | |
|---|---|---|
| EP | 2 921 326 A2 | 9/2015 |
| WO | 2015/010502 A1 | 1/2015 |

\* cited by examiner

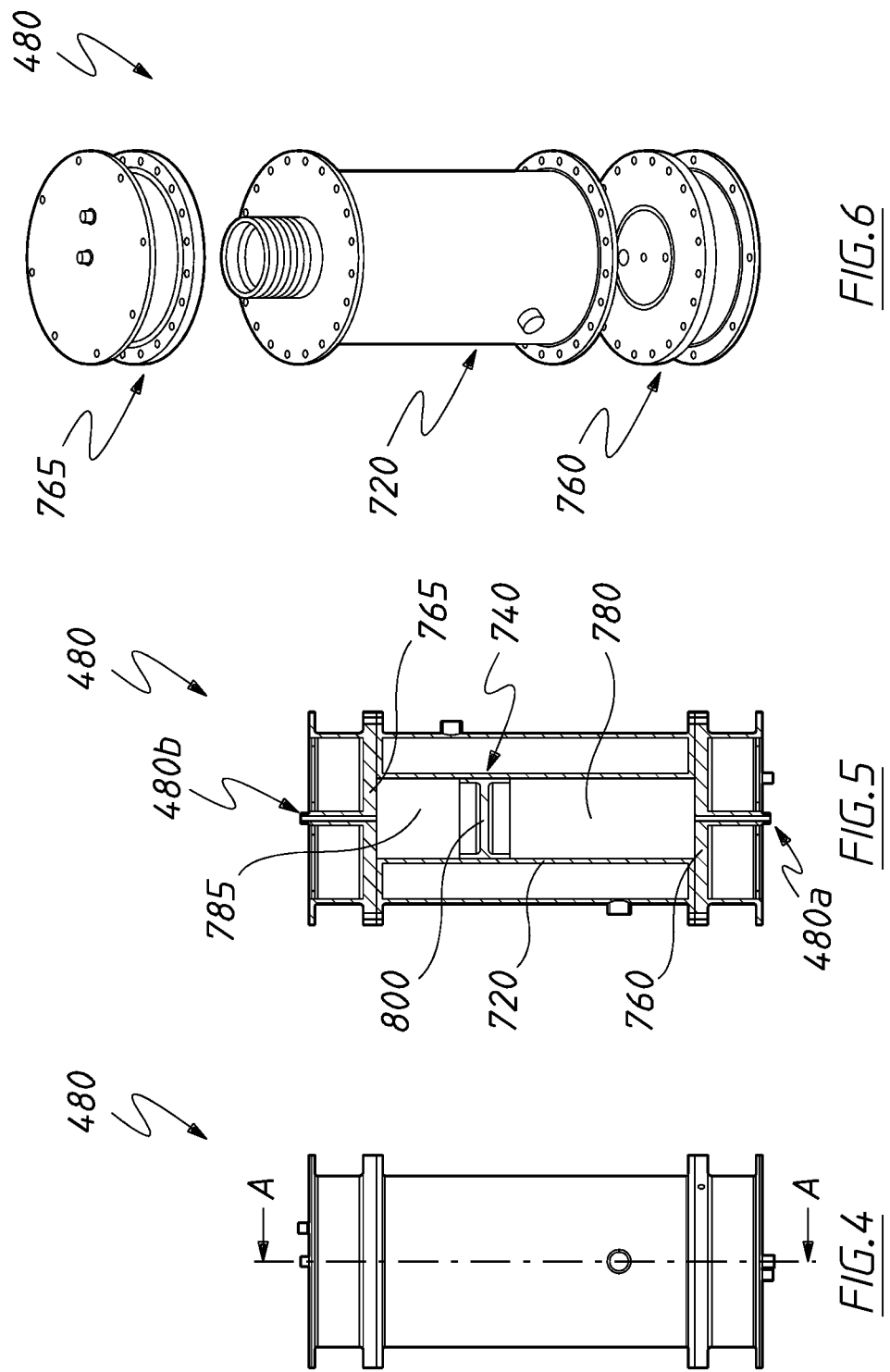

SUBSYSTEM FOR A VAPOUR-COMPRESSION SYSTEM, A VAPOUR-COMPRESSION SYSTEM, AND A METHOD FOR A VAPOUR-COMPRESSION SYSTEM

This application is a U.S. National Phase Application of PCT/AU2016/000255, filed Jul. 18, 2016, which claims priority to Australian Provisional Application Nos. 2015902860, filed Jul. 20, 2015 and 2016900063, filed Jan. 11, 2016, the entireties of which are incorporated by reference herein.

FIELD

The present invention relates to a subsystem for a vapour-compression system, a vapour-compression system, and a method for a vapour-compression system.

The invention has been primarily developed for use in an air conditioning system, and will be described hereinafter with reference to that application. However, the invention is not limited to that application and is also suitable for use in a refrigeration system.

BACKGROUND

Refrigeration and air conditioning systems are used to heat and/or cool air in enclosed environments.

In one form, a refrigeration and air conditioning system utilises the vapour-compression cycle driven by a fixed speed compressor. During operation of this system, the fixed speed compressor can be shut down when not required in order to reduce energy consumption of the system. However, when the compressor is required, a significant amount of energy is drawn to restart the compressor and is further used to bring the refrigerant to its optimal operating state. Further, the fixed speed compressor is unable to ramp up or ramp down in speed during operation to allow for a more energy efficient profile. In another form, a refrigeration and air conditioning system utilises the vapour-compression cycle driven by a variable speed compressor. Although the variable speed compressor allows for the ramp up or ramp down in speed during operation, it is inefficient to shut down and therefore utilises energy even when not required.

Given the cost and demand for energy, there is a need to reduce the overall energy consumption of refrigeration and air conditioning systems driven by compressors.

OBJECT OF INVENTION

It is the object of the present invention to at least address the above need, or at least provide a useful alternative.

SUMMARY OF INVENTION

In an aspect of the present invention, there is provided a subsystem for a vapour-compression system having a compressor and a condenser, the subsystem including:

a storage assembly fluidly communicable with a compressor inlet of the compressor for flow of refrigerant, the storage assembly being configured to receive and store refrigerant in a storing configuration, and release refrigerant stored therein to the compressor inlet of the compressor in a releasing configuration; and a flow-directing assembly in fluid communication with the storage assembly for flow of refrigerant, and fluidly communicable with a condenser inlet of the condenser and a compressor outlet of the compressor for flow of refrigerant, the flow-directing assembly being configured to direct refrigerant from the compressor outlet to the storage assembly in a first flow configuration, and direct refrigerant from the compressor outlet to the condenser inlet in a second flow configuration.

The storage assembly may be further configured to release refrigerant stored therein to the flow-directing assembly in a pressure-balancing configuration, and the flow-directing assembly is further configured to direct refrigerant from the storage assembly to the condenser inlet in a third flow configuration.

The storage assembly may comprise:

a container for containment of compressed refrigerant, the container having a container port, a first storage port in selective fluid communication with the container port for flow of refrigerant, and a second storage port in selective fluid communication with the container port for flow of refrigerant, and the second storage port being fluidly communicable with the compressor inlet for flow of refrigerant.

The flow-directing assembly may comprise:

a first flow port fluidly communicable with the compressor outlet of the compressor for flow of refrigerant, a second flow port in selective fluid communication with the first flow port for flow of refrigerant, and the second flow port being fluidly communicable with the condenser inlet, and a third flow port in selective fluid communication with the first flow port and the second flow port for flow of refrigerant, and the third flow port being fluidly communicable with the first storage port.

The subsystem may further include a controller operatively associated with the storage assembly and the flow-directing assembly, the controller for configuring the storage assembly into at least one of the storing, releasing and pressure balancing configurations, and configuring the flow-directing assembly in at least one of the first flow, second flow, and third flow configurations.

When the controller configures the storage assembly into the storing configuration, the controller may configure the flow-directing assembly to the first flow configuration.

When the controller configures the storage assembly into the pressure balancing configuration, the controller may configure the flow-directing assembly to the third flow configuration.

The storage assembly may further comprise:

a first storage valve actuatable between an open position and a closed position for respectively allowing and preventing flow of refrigerant between the first storage port and the container port; and a second storage valve actuatable between an open position and a closed position for respectively allowing and preventing flow of refrigerant between the second storage port and the container port.

The controller may configure the storage assembly into the storing configuration or the pressure balancing configuration by actuation of at least:

the first storage valve to the open position; and the second storage valve to the closed position.

The controller may configure the storage assembly into the releasing configuration by actuation of at least:

the first storage valve to the closed position; and the second storage valve to the open position.

The subsystem may further include a suction valve operatively associated with the controller, and actuatable between an open position and a closed position for respectively allowing and preventing flow of refrigerant therethrough, the second storage port being fluidly communicable with the compressor inlet via the suction valve.

When the controller configures the storage assembly into the releasing configuration, the controller may actuate the suction valve to the open position.

The flow-directing assembly may further comprise:
a first flow valve actuatable between an open position and a closed position for respectively allowing and preventing flow of refrigerant between the first flow port and second flow port;
a second flow valve actuatable between an open position and a closed position for respectively allowing and preventing flow of refrigerant between the first flow port and the third flow port; and
a third flow valve actuatable between an open position and a closed position for respectively allowing and preventing flow of refrigerant between the third flow port and the second flow port.

The controller may configure the flow-directing assembly into the first flow configuration by actuation of at least:
the first flow valve to the closed position;
the second flow valve to the open position; and
the third flow valve to the closed position.

The controller may configure the flow-directing assembly into the second flow configuration by actuation of at least:
the first flow valve to the open position;
the second flow valve to the closed position; and
the third flow valve to the closed position.

The controller may configure the flow-directing assembly into the third flow configuration by actuation of at least:
the first flow valve to the closed position;
the second flow valve to the closed position; and
the third flow valve to the open position.

The storage assembly may comprise:
a container for containment of compressed refrigerant, the container having a container port, and
a storage port in selective fluid communication with the container port for flow of refrigerant, and the storage port being fluidly communicable with the compressor inlet for flow of refrigerant.

The flow-directing assembly may comprise:
a first flow port fluidly communicable with the compressor outlet of the compressor for flow of refrigerant,
a second flow port in selective fluid communication with the first flow port for flow of refrigerant, and the second flow port being fluidly communicable with the condenser inlet, and
a third flow port in selective fluid communication with the first flow port and the second flow port for flow of refrigerant, and the third flow port being in fluid communication with the storage port.

The subsystem may further include a controller operatively associated with the storage assembly and the flow-directing assembly, the controller for configuring the storage assembly into at least one of the storing, releasing and pressure balancing configurations, and configuring the flow-directing assembly in at least one of the first flow, second flow, and third flow configurations.

When the controller configures the storage assembly into the storing configuration, the controller may configure the flow-directing assembly to the first flow configuration.

When the controller configures the storage assembly into the pressure balancing configuration, the controller may configure the flow-directing assembly to the third flow configuration.

The storage assembly may further comprise:
a storage valve actuatable between an open position and a closed position for respectively allowing and preventing flow of refrigerant between the storage port and the container port.

The controller may configure the storage assembly into the storing configuration, the pressure-balancing configuration or the releasing configuration by actuation of at least:
the storage valve to the open position.

The subsystem may further include a suction valve operatively associated with the controller, and actuatable between an open position and a closed position for respectively allowing and preventing flow of refrigerant therethrough, the storage port being fluidly communicable with the compressor inlet via the suction valve.

When the controller configures the storage assembly into the releasing configuration, the controller may actuate the suction valve to the open position.

The flow-directing assembly may further comprise:
a flow valve actuatable to a first flow position, a second flow position, or a third flow position, the flow valve in the first flow position allowing the flow of refrigerant between the first flow port and the third flow port, the flow valve in the second flow position allowing the flow of refrigerant between the first flow port and the second flow port, and the flow valve in the third flow position allowing the flow of refrigerant between the third flow port and the second flow port.

The controller may configure the flow-directing assembly into the first flow configuration by actuation of at least:
the flow valve to the first flow position.

The controller may configure the flow-directing assembly into the second flow configuration by actuation of at least:
the flow valve to the second flow position.

The controller may configure the flow-directing assembly into the third flow configuration by actuation of at least:
the flow valve to the third flow position.

The subsystem may further include:
a condenser sensor operatively associated with the controller and configured to measure the temperature and/or humidity at or near the condenser; and
an evaporator sensor operatively associated with the controller and configured to measure the temperature and/or humidity at or near an evaporator of the vapour-compression system.

The system may further comprise a suction sensor operatively associated with the controller and configured to measure the temperature and/or pressure at or near the suction valve.

The storage assembly may further comprise a container sensor configured to measure the temperature and/or pressure at the container port or within the container.

The flow-directing assembly may further comprise a first compressor sensor configured to measure the temperature and/or pressure at or near the first flow port, and a second compressor sensor configured to measure the temperature and/or pressure at or near the second flow port.

The controller may configure the storage assembly into at least one of the storing, releasing and the pressure-balancing configurations in response to one or more measurements from at least one of the condenser sensor, the evaporator sensor, the container sensor, the first compressor sensor, the second compressor sensor and the suction sensor.

The controller may configure the flow-directing assembly into at least one of the first flow, second flow and third flow configurations in response to one or more measurements from at least one of the condenser sensor, the evaporator sensor, the container sensor, the first compressor sensor, the second compressor sensor and the suction sensor.

The first storage valve may be adjustable in the open position such that the flow rate of refrigerant therethrough is controllable by the controller.

The suction valve may be adjustable in the open position such that the flow rate of refrigerant therethrough is controllable by the controller.

The storage assembly may further comprise a storage condenser for condensing refrigerant flowing therethrough, the container port being in selective fluid communication with the second storage port via the storage condenser.

The container may be vacuum insulated.

The container may comprise an internal chamber in which refrigerant is containable. The storage assembly may be configured to adjust the volume of the internal chamber. The internal chamber may be substantially defined by a wall, a first end and a second end, wherein the first end may be moveable relative to the second end. The storage assembly may further comprise a motor operatively connected with the first end to move the first end relative to the second end. The first end may comprise a piston sealingly engaged with the wall.

In accordance with another aspect of the present invention, there is provided a vapour-compression system, including:

a condenser having a condenser inlet;

a compressor having a compressor inlet and a compressor outlet;

a storage assembly in fluid communication with the compressor inlet for flow of refrigerant, the storage assembly being configured to receive and store refrigerant in a storing configuration, and release refrigerant stored therein to the compressor inlet of the compressor in a releasing configuration; and a flow-directing assembly in fluid communication with the storage assembly, the condenser inlet and the compressor outlet for flow of refrigerant, the flow-directing assembly being configured to direct refrigerant from the compressor outlet to the storage assembly in a first flow configuration, and direct refrigerant from the compressor outlet to the condenser inlet in a second flow configuration.

In accordance with another aspect of the present invention, there is provided a method for a vapour-compression system having a compressor and a condenser, the method including the steps of:

directing refrigerant from a compressor outlet of the compressor to a storage assembly;

storing refrigerant received from the compressor outlet in the storage assembly; and releasing refrigerant stored in the storage assembly to a compressor inlet of the compressor.

The method may further include the step of releasing refrigerant stored in the storage assembly, and directing refrigerant released from the storage assembly to the condenser inlet.

In accordance with another aspect of the present invention, there is provided a subsystem for a vapour-compression system, the subsystem including:

a storage assembly for storing refrigerant; and a flow-directing assembly in fluid communication with the storage assembly, wherein the flow-directing assembly is adapted to direct refrigerant from the vapour-compression system to the storage assembly for storage therein, and wherein the storage assembly is adapted to release refrigerant stored therein into the vapour-compression system.

The storage assembly may comprise a container with an internal chamber in which refrigerant is storable.

The container may be vacuum insulated.

The internal chamber may have a volume and the storage assembly may be configured to adjust the volume.

The internal chamber may be substantially defined by a wall, a first end and a second end, wherein the first end is moveable relative to the second end.

The storage assembly may further comprise a motor operatively connected with the first end to move the first end relative to the second end.

The storage assembly may further comprise a hydraulic system configured to move the first end relative to the second end.

The first end may comprise a piston sealingly engaged with the wall.

There is also disclosed, in combination, the subsystem as described above and the vapour-compression system, wherein the flow-directing assembly and the storage assembly are in fluid communication with the vapour-compression system.

The vapour-compression system may comprise a compressor which is in an on-state when the flow-directing assembly directs refrigerant from the vapour-compression system to the storage assembly and/or when the storage assembly releases refrigerant stored therein into the vapour-compression system.

BRIEF DESCRIPTION OF DRAWINGS

Preferred embodiments of the invention will be described hereinafter, by way of examples only, with reference to the accompanying drawings, wherein:

FIG. 4 shows a front view of a container of the vapour-compression system of FIG. 3;

FIG. 5 is a cross-sectional view of the container of FIG. 4 taken along line A-A; and FIG. 6 is an exploded view of the container of FIG. 4.

DESCRIPTION OF EMBODIMENTS

Figure 1:
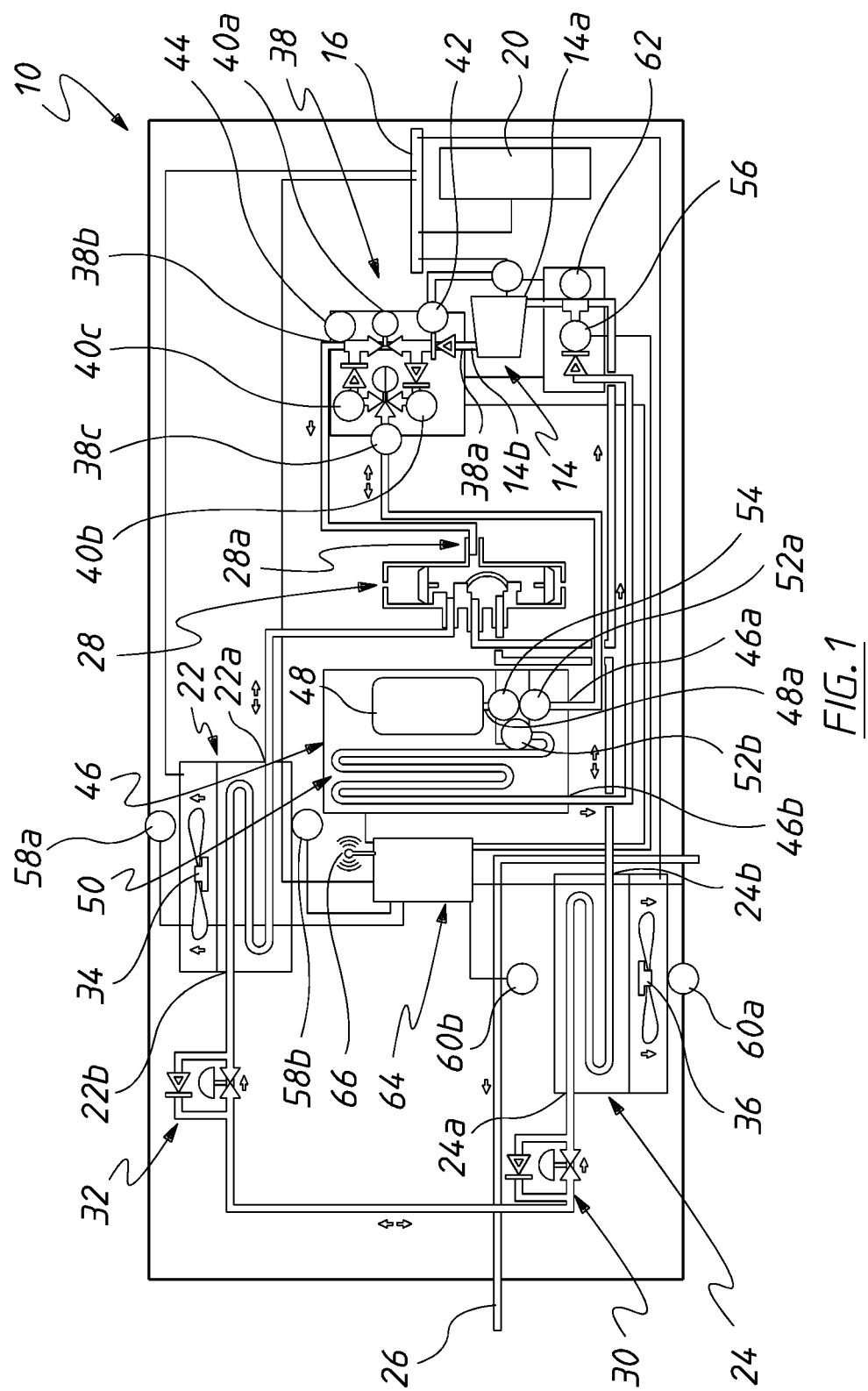
FIG. 1 shows a schematic view of a first embodiment of a vapour-compression system.

FIG. 1 shows a first embodiment of a vapour-compression system 10 in the form of an air conditioning system. The system 10 includes a fixed speed compressor 14 for compressing refrigerant. The compressor 14 has a compressor inlet 14*a* for the intake of refrigerant and a compressor outlet 14*b* for the discharge of compressed refrigerant. The compressor 14 is electrically actuatable to an on-state and an off-state by a main control board 16 of the system 10, which is powered by the mains 20 (e.g., 240V).

The system 10 further includes two heat exchangers 22, 24. The heat exchanger 22 is located in an outside area and the heat exchanger 24 is located in an inside area. A line 26 in FIG. 1 demarcates the outside and inside areas. The system 10 further comprises a reversing valve 28 for reversing the direction of flow of refrigerant in the system 10 such that the system 10 either cools or heats the inside area. It will be appreciated that, depending on the direction of flow of refrigerant caused by the reversing valve 28, each heat exchanger 22, 24 acts as either a condenser for condensing refrigerant flowing therethrough or an evaporator for evaporating refrigerant flowing therethrough. However, as FIG. 1 shows the reversing valve 28 in a configuration in which the system 10 is cooling the inside area, the heat exchanger 22 will hereinafter be referred to as the condenser and the heat exchanger 24 will hereinafter be referred to as the evaporator.

The condenser 22 has a condenser inlet 22a for the intake of refrigerant and a condenser outlet 22b for discharging condensed and cooled refrigerant. The evaporator 24 has an evaporator inlet 24a for the intake of refrigerant and an evaporator outlet 24b for discharging evaporated and heated refrigerant. The condenser outlet 22b is fluidly connected to the evaporator inlet 24a. The reversing valve 28 is fluidly connected to the evaporator outlet 24b such that the evaporated refrigerant discharged therefrom is directed to the compressor inlet 14a. The reversing valve 28 is also fluidly connected to the condenser inlet 22a such that any refrigerant received via a reversing inlet 28a is directed to the condenser inlet 22a.

The system 10 further includes two expansion valves 30, 32 located in the connection between the condenser outlet 22b and the evaporator inlet 24a. Each expansion valve 30, 32 is configured to abruptly reduce the pressure of refrigerant passing therethrough. The expansion valve 30 is used only when the system 10 is cooling the inner area and is bypassed when the system 10 is heating the inner area. Conversely, the expansion valve 32 is used only when the system 10 is heating the inner area and is bypassed when the system 10 is cooling the inner area.

The system 10 further includes two fans 34, 36. The fan 34 is configured to induce airflow across the condenser 22 and the fan 36 is configured to induce airflow across the evaporator 24.

The system 10 further includes a flow-directing assembly 38 for directing refrigerant. The flow-directing assembly 38 comprises three flow ports 38a, 38b, 38c. Each of the flow ports 38a, 38b, 38c is configured for passage of refrigerant. The flow port 38a is fluidly connected to the flow ports 38b, 38c and the compressor outlet 14b. The flow port 38b is also fluidly connected to the flow port 38c and the reversing inlet 28a.

The flow-directing assembly 38 further comprises three flow valves 40a, 40b, 40c. The flow valve 40a is located in the connection between the flow ports 38a, 38b. The flow valve 40a is electrically actuatable between an open position and a closed position for respectively allowing and preventing flow of refrigerant between the flow ports 38a, 38b. The flow valve 40b is located in the connection between the flow ports 38a, 38c. The flow valve 40b is electrically actuatable between an open and a closed position for respectively allowing and preventing flow of refrigerant between the flow ports 38a, 38c. The flow valve 40c is located in the connection between the flow ports 38b, 38c. The flow valve 40c is electrically actuatable between an open and a closed position for respectively allowing and preventing flow of refrigerant between the flow ports 38b, 38c.

In other embodiments, it will be appreciated that the flow valves 40a, 40b, 40c may be pneumatically actuatable between their respective open and closed positions. In other embodiments, it will be appreciated that the flow valves 40a, 40b, 40c may be replaced by other valve combinations to achieve similar flow paths.

In the first embodiment, the flow-directing assembly 38 further comprises two compressor sensors 42, 44. The compressor sensor 42 is located at or near the flow port 38a and is configured to measure the temperature and pressure of refrigerant at the flow port 38a. The compressor sensor 44 is located at or near the flow port 38b and is configured to measure the temperature and pressure of refrigerant at the flow port 38b.

The system 10 further includes a storage assembly 46 for storing and releasing refrigerant. The storage assembly 46 comprises two storage ports 46a, 46b. Each of the storage ports 46a, 46b is configured for passage of refrigerant. The storage port 46a is fluidly connected to the flow port 38c and the storage port 46b is fluidly connected to the compressor inlet 14a.

The storage assembly 46 further comprises a vacuum insulated container 48 for containment of compressed refrigerant. The container 48 has a container port 48a for passage of refrigerant and is fluidly connected to the storage ports 46a, 46b. The storage assembly 46 further comprises a storage condenser 50 for condensing refrigerant flowing therethrough. The storage condenser 50 is located in the connection between the container port 48a and the storage port 46b.

In another embodiment, the storage assembly 46 does not comprise the storage condenser 50. Instead, the container port 48a is directly connected to the storage port 46b.

In the first embodiment, the storage assembly 46 further comprises two storage valves 52a, 52b. The storage valve 52a is located in the connection between the container port 48a and the storage port 52a. The storage valve 52a is electrically actuatable between an open position and a closed position for respectively allowing and preventing flow of refrigerant between the container port 48a and the storage port 52a. The storage valve 52a is in the form of a metered electronic valve such that the storage valve 52a is electrically adjustable in the open position to regulate the flow rate of refrigerant therethrough. The storage valve 52b is located in the connection between the container port 48a and the storage port 46b. The storage valve 52b is electrically actuatable between an open position and a closed position for respectively allowing and preventing flow of refrigerant between the container port 48a and the storage port 46b.

The storage assembly 46 further comprises a container sensor 54 located at or near the container port 48a and configured to measure the temperature and pressure of refrigerant at the container port 48a.

The system 10 further includes a suction valve 56 that fluidly connects the storage port 46b to the compressor inlet 14a. The suction valve 56 is electrically actuatable between an open position and a closed position for respectively allowing and preventing flow of refrigerant between the storage port 46b and the compressor inlet 14a. The suction valve 56 is in the form of a metered electronic valve such that the suction valve 56 is electrically adjustable in the open position to regulate the flow rate of refrigerant therethrough.

In another embodiment, the system 10 does not comprise the suction valve 56. Instead, the storage port 46b is directly connected to the compressor inlet 14a.

In the first embodiment, the system 10 further includes two condenser sensors 58a, 58b, two evaporator sensors 60a, 60b, and a suction sensor 62. The condenser sensors 58a, 58b are located at or near the condenser 22 and configured to measure the temperature and humidity of the air passed through the condenser 22. The evaporator sensors 60a, 60b are located near the evaporator 24 and configured to measure the temperature and humidity of the air passed through the evaporator 24. The suction sensor 62 is located at or near the suction valve 56 and configured to measure the temperature and pressure of the refrigerant at the compressor inlet 14a.

In another embodiment, the controller 64 and the main control board 16 may be a single integrated component.

The system 10 further includes a controller 64 in the form of an electronic control module. The controller 64 is electrically connected with the main control board 16, the flow-directing assembly 38, the storage assembly 46, the suction valve 56 and the sensors 58a, 58b, 60a, 60b, 62. The controller 64 is configured to actuate the valves 40a, 40b, 40c, 52a, 52b, 56 and also adjust the valves 52a, 56 in their open positions. The controller 64 has an antenna 66 to wirelessly communicate with a computer system to update its software and/or control parameters and/or usage details.

In another embodiment, the system 10 further includes two expansion sensors (not shown). A first of the expansion sensors is located near the expansion valve 30 and configured to measure the pressure and/or temperature of the refrigerant immediately after the expansion valve 30. A second of the expansion sensors is located near the expansion valve 32 and configured to measure the pressure and/or temperature of the refrigerant immediately after the expansion valve 32. It will be appreciated that, simile to the sensors 58a, 58b, 60a, 60b, 62, the controller 64 will be electrically connected to the expansion sensors.

An exemplary operation of the system 10 of the first embodiment to cool the inside area to a predetermined temperature will now be described.

Initial Start Up:

After a user turns on the system 10, the main control board 16 actuates the compressor 14 to the on-state. Simultaneously, the controller 64 actuates the suction valve 56 to the closed position and configures the flow-directing assembly 38 into a compressor flow configuration by:

actuation of the flow valve 40a to the open position;
actuation of the flow valve 40b to the closed position; and
actuation of the flow valve 40c to the closed position.

The flow-directing assembly 38 in the compressor flow configuration directs compressed refrigerant from the compressor outlet 14b to the condenser inlet 22a for normal operation of the system 10 (i.e., the vapour-compression cycle).

Storage During Operation:

During operation of the system 10, based on one or more of the sensors 42, 44, 54, 58a, 58b, 60a, 60b, 62, the controller 64 is able to determine when the compressor 14 is generating more cooling capacity than required. In this event, the controller 64 configures the flow-directing assembly 38 into a storage flow configuration by:

actuation of the flow valve 40a to the closed position;
actuation of the flow valve 40b to the open position; and
actuation of the flow valve 40c to the closed position.

The flow-directing assembly 38 in the storage flow configuration directs compressed and heated refrigerant from the compressor outlet 14b to the storage port 46a. Simultaneously, the controller 64 configures the storage assembly 46 into a storing configuration by:

actuation of the storage valve 52a to the open position; and
actuation of the storage valve 52b to the closed position.

The storing assembly 46 in the storing configuration directs compressed refrigerant received through the storage port 46a into the container 48 for storage via the container port 48a.

Once the controller 46 determines that the optimal running capacity for the current load and conditions are met based on one or more of the sensors 42, 44, 54, 58a, 58b, 60a, 60b, 62, the controller 64 configures the flow-directing assembly 38 into the compressor configuration for normal operation of the system 10 as described above. Simultaneously, the controller 64 configures the storage assembly 46 into an isolation configuration by:

actuation of the storage valve 52a to the closed position; and
actuation of the storage valve 52b to the closed position.

The storage assembly 46 in the isolation configuration seals compressed refrigerant in the container 48. It will be appreciated that the compressed refrigerant stored in the container 48 will substantially maintain its thermal and pressure energy as the container 48 is vacuum insulated.

In this "storage during operation" phase, the reduction in refrigerant within the system 10 causes the mechanical load from the compressor 14 to be reduced while in the on-state and thereby reduces unnecessary energy consumption.

Releasing During Operation:

During operation of the system 10, based on one or more of the sensors 42, 44, 54, 58a, 58b, 60a, 60b, 62, the controller 64 is able to determine when the system capacity is too low and not optimal for the current conditions. In this event, the controller 64 configures the storage assembly 46 into a releasing configuration by:

actuation of storage valve 52a to the closed position; and
actuation of the storage valve 52b to the open position.

The storage assembly 46 in the releasing configuration releases compressed refrigerant stored in the container 48 and passes it through the storage condenser 50 where it is condensed, and out the storage port 46b. Simultaneously, the controller 64 actuates the suction valve 56 to the open position allowing the refrigerant from the storage port 46b to be received in the compressor inlet 14a. The controller 64 also adjusts the suction valve 56 in the open position such that it regulates the flow rate of refrigerant therethrough based on the sensor 62. This ensures that refrigerant mixed with refrigerant from the evaporator outlet 24b is returned to the compressor inlet 14a at an optimal temperature/pressure for reducing mechanical load.

Once the controller 64 determines that the optimal running capacity for the current load and conditions are met based on one or more of the sensors 42, 44, 54, 58a, 58b, 60a, 60b, 62, the controller 64 configures the configures the storage assembly 46 into the isolation configuration.

It will be appreciated that the system 10 will cycle between the "storage during operation" and "releasing during operation" phases such that the compressor 14 is able to run at its most optimal state. Also, releasing the refrigerant stored in the container 48 through the storage condenser 50 may allow the compressor 14 to create a small amount of vacuum pressure without any extra mechanical load due to thinner refrigerant being introduced to the compressor inlet 14a. This slight vacuum effect may result in less mechanical load required for storing refrigerant in the container 48 in the "storage during operation" phase described above and the "shutdown" phase described below.

Shutdown:

During operation of the system 10, based on one or more of the sensors 42, 44, 54, 58a, 58b, 60a, 60b, 62, the controller 64 is able to determine when the predetermined temperature has been reached in the inside area or it is inefficient to continue running the compressor 14. In this event, the controller 64 sends a signal to the main control board 16 to maintain the compressor 14 in the on-state. Simultaneously, the controller 64 configures the flow-directing assembly 38 into the storage flow configuration and the storage assembly 46 into the storing configuration for storing compressed refrigerant in the container 48. It will again be appreciated that the compressed refrigerant stored in the container 48 will substantially maintain its thermal and pressure energy as the container 48 is vacuum insulated.

Once the sensor 62 indicates that the system 10 is approaching its low pressure set point, the controller 64 sends a signal to the main control board 16 to actuate the compressor 14 to the off-state, configures the storage assembly 46 into the isolation configuration and configures the flow-directing assembly 38 into a no-flow configuration by:

actuation of the flow valve 40a to the closed position;
actuation of the flow valve 40b to the closed position; and
actuation of the flow valve 40c to the closed position.

Once the storage assembly 46 is in the isolation configuration and the flow-directing assembly 38 is in the no-flow configuration, the controller 64 actuates the flow valve 40a to the open position in order relieve pressure from the compressor head. Once the sensor 42 indicates that the pressure has been relieved, the controller 64 actuates the flow valve 40a to the closed position.

Startup:

From shutdown, when the temperature rises above the predetermined temperature in the inside area and the compressor 14 is required for the system 10 to generate cooling capacity based on one or more of the sensors 42, 44, 54, 58a, 58b, 60a, 60b, 62, the controller 64 configures the flow-directing assembly 38 into a storage-compressor flow configuration by:

actuation of the flow valve 40b to the open position; and
actuation of the flow valve 40c to the open position.

The flow-directing assembly 38 in the storage-compressor flow configuration directs refrigerant from the flow port 38c to the condenser inlet 22a via the flow port 38b. Further, the controller 64 configures the storage assembly 46 into a pressure-balancing configuration by:

actuation of storage valve 52a to the open position; and
actuation of the storage valve 52b to the closed position.

The storage assembly 46 in the pressure-balancing configuration releases compressed refrigerant stored in the container 48 to flow through the storage port 46a, the flow port 38c, and the flow port 38b to the condenser inlet 22a such that the stored energy is released into the system 10.

Once the controller 64 determines enough stored energy is released into the system 10 based on one or more of the sensors 42, 44, 54, 58a, 58b, 60a, 60b, 62, the controller 64 sends a signal to the main control board 16 to actuate the compressor 14 to the on-state, configures the flow-directing assembly 38 into the condenser flow configuration, configures the storage assembly 46 to the releasing configuration and actuates the suction valve 56 to the open position. This allows refrigerant stored in the container 48 to be released into the compressor inlet 14a.

Once the controller 64 determines that the container 48 has released enough stored energy based on one or more of the sensors 42, 44, 54, 58a, 58b, 60a, 60b, 62, the controller 64 configures the storage assembly 46 into the isolation configuration and actuates the suction valve 56 to the closed position.

In this "startup" phase, the system 10 arrives at optimal temperature and pressure faster due to the introduction of the stored thermal and pressure energy, and thereby reduces the running time required by the compressor 14 to achieve the required cooling capacity. The storage and release of otherwise wasted thermal and pressure energy developed by the compressor 14 during shutdown/startup phase cycles therefore saves energy. Further, the startup" phase allows the compressor 14 to actuate to the on-state with less energy usage through decreasing the gas in the circuit and/or pressurising the suction side of the compressor 14 with the released refrigerant.

An advantage of the system 10 is that cooling capacity of the system 10 can be reduced whilst it is operating, reducing energy usage, and still being able to shut down when this is the most efficient option.

The system 10 described above can be provided as a new installation. Alternatively, installing the subsystem (i.e., at least the flow-directing assembly 38, the storage assembly 46, and the controller 64) to an existing vapour-compression system by way of a retrofit can form an equivalent system. Such a retrofitted vapour-compression system will provide similar advantages as described above.

Figure 2:
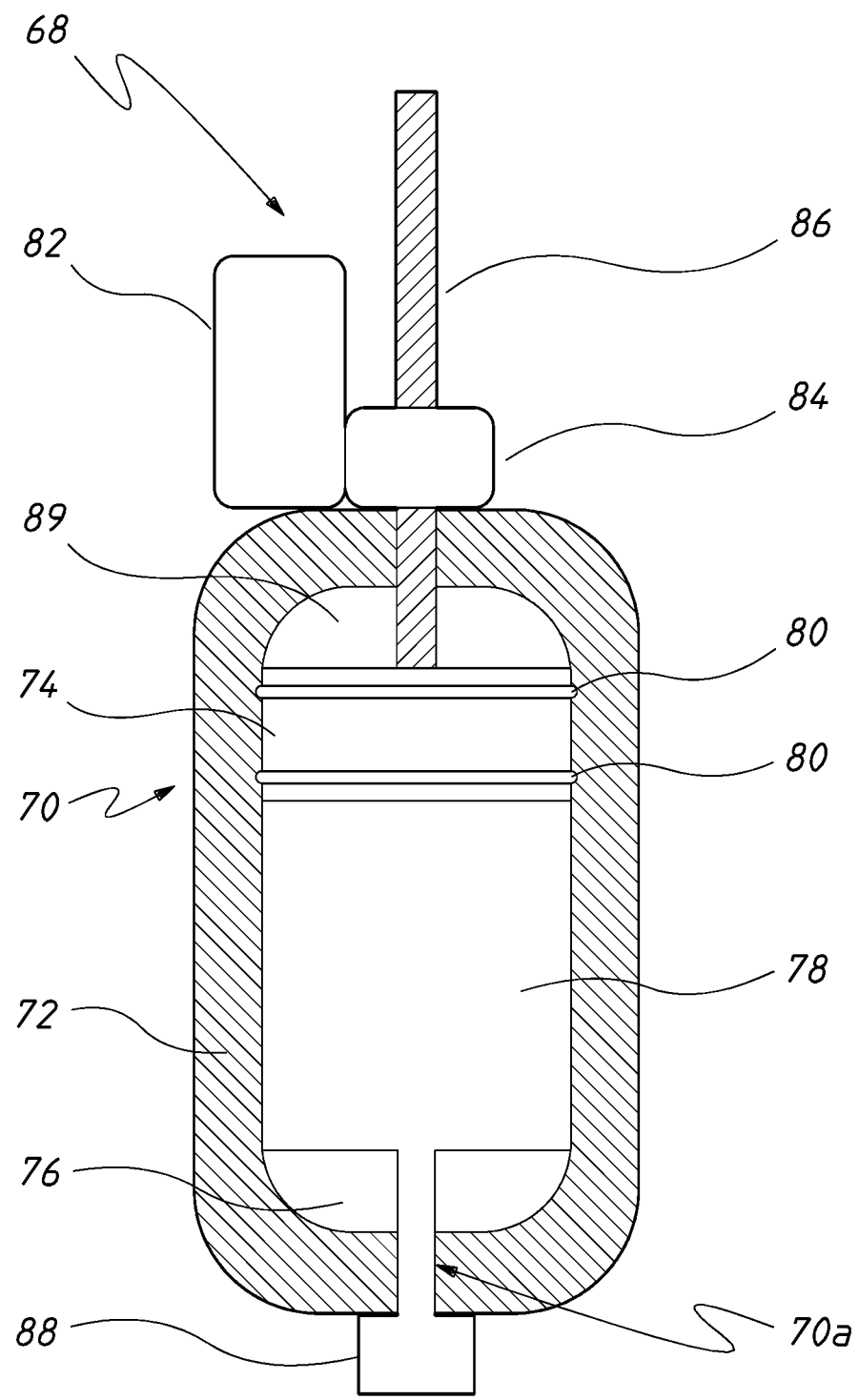
FIG. 2 shows a schematic view of a storage assembly of a second embodiment of a vapour-compression system.
Figure 3:
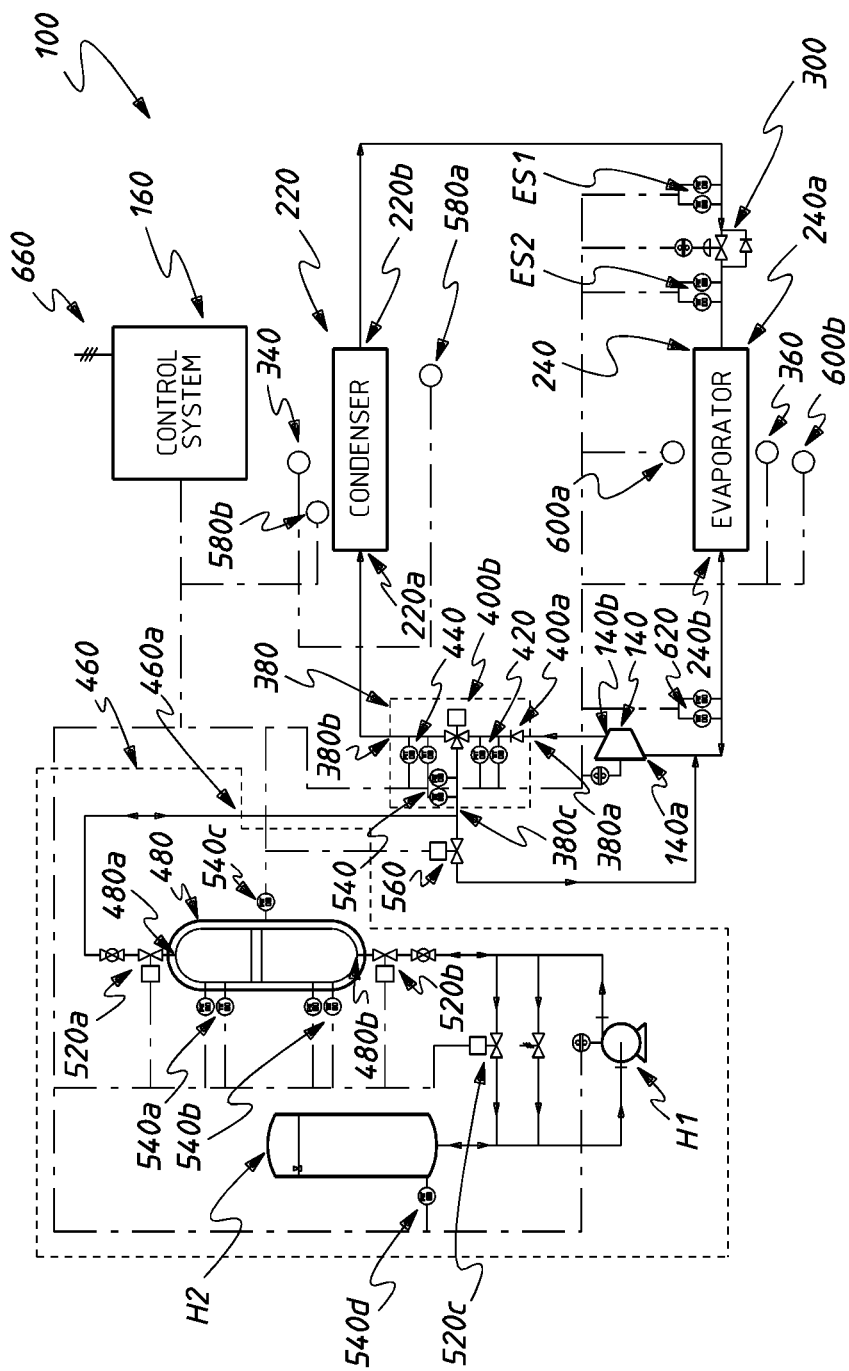
FIG. 3 shows a schematic view of a third embodiment of a vapour-compression system.

FIG. 2 shows a storage assembly 68 of a second embodiment of a vapour-compression system (not shown). With the exception of the storage assembly 68 (which will be described in detail below), it will be appreciated that the second embodiment of the vapour-compression system is substantially similar to the first embodiment of the vapour-compression system 10 as described above. Accordingly, reference numerals used to denote components of the first embodiment of the vapour-compression system 10 will also be used to denote like components of the second embodiment of the vapour-compression system.

As shown in FIG. 2, in this embodiment, the storage assembly 68 comprises a container 70. The container 70 is substantially cylindrical in shape and is vacuum insulated by a wall 72 to maintain the temperature and pressure of any refrigerant stored therein (typically, the refrigerant stored therein would be in the form of a super-heated gas). The storage assembly 68 further comprises a piston 74 located within the container 70 such that the wall 72, the piston 74 and an end 76 of the container 70 define an internal chamber 78. It will be appreciated that the refrigerant stored in the container 70 will be contained in the internal chamber 78. The piston 74 is dimensioned to allow for movement to and from the end 76 of the container 70, and is sealingly engaged with the wall 72 by seals 80. It will be appreciated that such movement would adjust the volume of the internal chamber 78. The container 70 comprises a container port 70a located at the end 76 to allow for passage of refrigerant to and from the internal chamber 78.

The storage assembly 68 further comprises a low voltage (e.g., 6V-24V DC) high torque electric motor 82, a motor gear set 84 and a threaded connecting rod 86. As shown in FIG. 2, the connecting rod 86 is secured to the piston 74 and extends outwardly through an end 89 of the container 70. The motor gear set 84 is operatively engaged with the threading of the connecting rod 86 and the motor 82. Due to this arrangement, it will be appreciated that the piston 74 will be moved to or from the end 76 of the container 70 when the motor 82 is powered. In this embodiment, the controller 64 is electrically connected to the motor 82 and controls its operation. It will also be appreciated that, in use, the motor 82 consumes substantially less energy than that of the compressor 14

The storage assembly 68 further comprises a manifold 88 which is fluidly connected to the container port 70a, the flow port 38c and the compressor inlet 14a. The manifold 88 comprises one or more variable metering valves (not shown) that regulate refrigerant entering the container port 70a from the flow port 38c or leaving the container port 70a to the compressor inlet 14a. In this embodiment, the manifold 88 is controlled by the controller 64 in a similar manner as described above in relation to storage valves 52a, 52b.

During an exemplary operation of the second embodiment of the system, when refrigerant is directed to the storage assembly 68 for storage, the valve(s) of the manifold 88 allow refrigerant to flow via the container port 70a into the internal chamber 78 for containment. To aid in this flow of refrigerant, the piston 74 is moved by the motor 82 to vary the volume of the internal chamber 78. In particular, the piston 74 is moved away from the end 76 of the container 70 to increase the volume of the internal chamber 78 and thereby form a low pressure therein. This causes a suction effect in which refrigerant is drawn into the internal chamber 78. Accordingly, it will be appreciated that the compressor 14 will have a reduced load while refrigerant is being stored in the container 70 due to the suction effect and thus energy will be saved as the motor 82 requires substantially less power to operate than that of the compressor 14.

When refrigerant is stored within the container 70 (i.e., the storage assembly 68 is in an isolation configuration), the valve(s) of the manifold 88 seals the internal chamber 78 of the container 70 and the volume of the internal chamber 78 is varied to increase the pressure of refrigerant therein. In particular, the piston 74 is slowly moved towards the end 76 of the container 70 by the motor 82 to decrease the volume of the internal chamber 78 and thereby apply pressure to the refrigerant stored therein. Once a predetermined pressure is reached in the internal chamber 78 (i.e., a pressure higher than the rest of the system), the piston 74 is stopped.

When refrigerant is released from the container 70 (i.e., the storage assembly 68 is in a releasing configuration), the valve(s) of the manifold 88 allow refrigerant to flow out of the internal chamber 78 towards the compressor inlet 14a and/or the condenser inlet 22a. It will be appreciated that the difference in pressure (i.e., high in the internal chamber 78 and low in the rest of the system) allows the refrigerant to readily flow out of the internal chamber 78. When a predetermined amount of refrigerant is released from the internal chamber 78 or when the pressure between the internal chamber 78 and the rest of the system is balanced, the valve(s) of the manifold 88 seals the internal chamber 78 of the container 70.

An advantage of the storage assembly 68 is that refrigerant can readily flow from and to the compressor 14 when required as the variable volume of the internal chamber 78 can produce differences in pressure.

Another advantage of the storage assembly 68 is that the peak loads experienced by the compressor 14 at startup may be reduced. For example, only a predetermined amount of stored refrigerant can be released to the compressor inlet 14a so that the compressor 14 can start with minimal head pressure as well as reduced load pressure. Then, the remaining refrigerant stored in the internal chamber 78 can be pressurised as described above to a predetermined pressure and another predetermined amount of refrigerant can be released. This process can be repeated until the system reaches full capacity.

Another advantage of the storage assembly 68 is that the system is able to startup at a desired/optimal capacity rather than starting immediately at full capacity.

Another advantage of the storage assembly 68 is that the volume of the internal chamber 78 can be adjusted to suit the capacity of each system. Accordingly, there is a reduced need to manufacture multiple sizes of the storage assembly 68 to suit different systems.

Further, the ability to vary the volume of the container 70 allows a reduction or increase in the capacity of the system by increasing or decreasing the amount of refrigerant in the system at any one time, whilst the system is in operation. This is due to the ability to create work to increase the pressure of the gas in the container 70, which is already in a stored super-heated state, to a pressure above that of the operating system. This allows for a high pressure to low pressure delivery system of the potential energy into the discharge of the system.

In addition, increasing the internal size of the container 70 allows the creation of a low pressure suction (vacuum like state) when removing the super-heated refrigerant for storage. By removing refrigerant from the system, the operating pressures are reduced and therefore mechanical load on the system's compressor is reduced. This reduces electrical load and saves energy when the system, due to environmental conditions, does not require full capacity. When the environmental conditions dictate that full or a higher capacity is required, the stored energy is reintroduced to the system. In this situation, the system compressor is not required to create the work to increase the capacity, only to maintain the reintroduced super-heated refrigerant (which is already at increased pressure and temperature).

FIGS. 3 to 6 shows a third embodiment of a vapour-compression system 100 in the form of an air conditioning system. The system 100 includes a fixed speed compressor 140 for compressing refrigerant. The compressor 140 has a compressor inlet 140a for the intake of refrigerant and a compressor outlet 140b for the discharge of compressed refrigerant. The compressor 140 is electrically actuatable to an on-state and an off-state by a control system 160 of the system 100, which is powered by the mains (e.g., 240V).

The system 100 further includes two heat exchangers 220, 240. The heat exchanger 220 is located in an outside area and the heat exchanger 240 is located in an inside area. In this embodiment, the heat exchanger 220 is in the form of a condenser and the heat exchanger 240 is in the form of an evaporator.

The condenser 220 has a condenser inlet 220a for the intake of refrigerant and a condenser outlet 220b for discharging condensed and cooled refrigerant. The evaporator 240 has an evaporator inlet 240a for the intake of refrigerant and an evaporator outlet 240b for discharging evaporated and heated refrigerant. The condenser outlet 220b is fluidly connected to the evaporator inlet 240a and the evaporator outlet 240b is fluidly connected to the compressor inlet 140a.

The system 100 further includes an expansion valve 300 located in the connection between the condenser outlet 220b and the evaporator inlet 240a. The expansion valve 300 is configured to abruptly reduce the pressure of refrigerant passing therethrough.

The system 100 further includes two fans 340, 360. The fan 340 is configured to induce airflow across the condenser 220 and the fan 360 is configured to induce airflow across the evaporator 240.

The system 100 further includes a flow-directing assembly 380 for directing refrigerant. The flow-directing assembly 380 comprises three flow ports 380a, 380b, 380c. Each of the flow ports 380a, 380b, 380c is configured for passage of refrigerant. The flow port 380a is fluidly connected to the flow ports 380b, 380c and the compressor outlet 140b. The flow port 380b is also fluidly connected to the flow port 380c and the condenser inlet 220a.

The flow-directing assembly 380 further comprises a passive valve 400a and a flow valve 400b. The passive valve 400a is located immediately following the flow port 380a, and prevents the backflow of refrigerant to the compressor 140. The flow valve 400b is located immediately following the passive valve 400a, and is a three-way electrically actuated ball valve. The flow valve 400b is actuatable to a first open flow position, a second open flow position, a third open flow position, and a closed position. The flow valve 400b in the first flow position allows the flow of refrigerant between the flow ports 380a, 380c. The flow valve 400b in the second flow position allows the flow of refrigerant between the flow ports 380a, 380b. The flow valve 400b in the third flow position allows the flow of refrigerant between the flow ports 380b, 380c. It will be appreciated that a similar flow configuration could be achieved through two two-way actuated ball valves, or through the use of three one-way actuated solenoid valves. It will be further appreciated that actuation may be achieved through other means such as pneumatic.

The flow-directing assembly 380 further comprises three compressor sensors 420, 440, 540. The compressor sensor 420 is located at or near the flow port 380a and is configured to measure the temperature and pressure of refrigerant at the flow port 380a. The compressor sensor 440 is located at or near the flow port 380b and is configured to measure the temperature and pressure of refrigerant at the flow port 380b. The compressor sensor 540 is located at or near the flow port 380c and is configured to measure the temperature and pressure of refrigerant at the flow port 380c.

The system 100 further includes a storage assembly 460 for storing and releasing refrigerant. The storage assembly 460 comprises a storage port 460a configured for passage of refrigerant. The storage port 460a is fluidly connected to the flow port 380c.

The storage assembly 460 further comprises a vacuum insulated container 480 for containment of compressed refrigerant. Referring to FIGS. 4 to 6, the container 480 is substantially cylindrical in shape and is vacuum insulated by a wall 720 to maintain the temperature and pressure of any refrigerant stored therein (typically, the refrigerant stored therein would be in the form of a super-heated gas). The storage assembly 460 further comprises a piston 740 located within the container 480 such that the wall 720, the piston 740 and an end 760 of the container 480 define an internal chamber 780. Also, the wall 720, the piston 740 and an end 765 of the container 480 define an internal hydraulic chamber 785. In the depicted embodiment, the ends 760, 765 are in the form of end plates. It will be appreciated that the refrigerant stored in the container 480 will be contained in the internal chamber 780. The piston 740 is dimensioned to allow for movement to and from the end 760 of the container 480, and is sealingly engaged with the wall 720 by a seal 800. It will be appreciated that such movement would adjust the volume of the internal chamber 780. The container 480 comprises a container port 480a located at the end 760 to allow for passage of refrigerant to and from the internal chamber 780. The container port 480a is fluidly connected to the storage port 460a.

The container 480 further comprises a hydraulic fluid container port 480b in the end 765 for passage of hydraulic fluid to and from the internal hydraulic chamber 785. The storage assembly 460 further comprises a hydraulic fluid tank H2 and a hydraulic pump H1 that are fluidly connected to the hydraulic fluid container port 480b. It will be appreciated that the piston 740 will be moved to and from the end 760 of the container 480 with the introduction and release of hydraulic fluid into the internal chamber 785. In this embodiment, the storage assembly 460 comprises two hydraulic valves 520b, 520c. The hydraulic valve 520b is located in the connection between the container port 480b and the hydraulic pump H1. The hydraulic valve 520b is electrically actuatable between an open position and a closed position for respectively allowing and preventing flow of hydraulic fluid between the container port 480b and the hydraulic pump H1. The hydraulic valve 520c is located in the connection between the control port 480b and the hydraulic fluid tank H2. The hydraulic valve 520c is electrically actuatable between an open and closed position for respectively allowing and preventing flow of hydraulic fluid between the container port 480b and the hydraulic fluid tank H2.

It will be appreciated that the operation of the storage assembly 460 will be substantially similar to that of the storage assembly 68 of the second embodiment of the vapour-compression system. However, the storage assembly 460 will utilise hydraulic fluid to move the piston 740 as opposed to a motor mechanically connected to the piston 740.

The storage assembly 460 further comprises a storage valve 520a. The storage valve 520a is located in the connection between the container port 480a and the storage port 460a. The storage valve 520a is electrically actuatable between an open position and a closed position for respectively allowing and preventing flow of refrigerant between the storage port 460a and the container port 480a.

The storage assembly 460 further comprises four sensors 540a, 540b, 540c, 540d. A first container sensor 540a is located at or near the internal chamber 780 and configured to measure the temperature and pressure of refrigerant stored within the container 480. A second container sensor 540b is located at or near the internal chamber 785 and configured to measure the temperature and pressure of hydraulic fluid stored within the container 480. A third container sensor 540c is located at or near the vacuum annulus of the container 480 and configured to measure the pressure within the vacuum annulus. A tank sensor 540d is located at or near the hydraulic fluid tank H2 and configured to measure the pressure of the hydraulic fluid within the hydraulic fluid tank H2. It will be appreciated that the tank sensor 540d can be used to determine the position of the piston 740 within the container 480.

The system 100 further includes a suction valve 560 that fluidly connects the storage port 460a to the compressor inlet 140a. The suction valve 560 is electrically actuatable between an open position and a closed position for respectively allowing and preventing flow of refrigerant between the storage port 460a and the compressor inlet 140a. Further, the suction valve 560 allows system 100 to be pressure equalized.

The system 100 further includes two condenser sensors 580a, 580b, two evaporator sensors 600a, 600b, and a suction sensor 620. The condenser sensors 580a, 580b are located at or near the condenser 220 and configured to measure the temperature and humidity of the air passed through the condenser 220. The evaporator sensors 600a, 600b are located near the evaporator 240 and configured to measure the temperature and humidity of the air passed through the evaporator 240. The suction sensor 620 is located at or near the compressor inlet 140a and configured to measure the temperature and pressure of the refrigerant at the compressor inlet 140a. The system 100 also includes two more pressure/temperature sensors ES1, ES2. These sensors ES1, ES2 are respectively configured to measure the temperature and pressure of the refrigerant at the inlet and outlet of the expansion valve 300.

The control system 160 is electrically connected to the flow-directing assembly 380, the storage assembly 460, the suction valve 560 and the sensors 580a, 580b, 600a, 600b, 620, ES1, ES2. The control system 160 is configured to actuate the valves 400*a*, 400*b*, 520*a*, 520*b*, 520*c*, 560. The control system 160 has an antenna 660 to wirelessly communicate with a computer system to update its software and/or control parameters and usage details.

An exemplary operation of the system 100 to cool the inside area to a predetermined temperature will now be described.

As the system 100 is running, the compressor 140 is in the on-state. Also, the control system 160 has: actuated the suction valve 560 to the closed position; and configured the flow-directing assembly 380 into a compressor-condenser flow configuration by actuating the flow valve 400*b* to the second flow position. The flow-directing assembly 380 in the compressor-condenser flow configuration directs compressed refrigerant from the compressor outlet 140*b* to the condenser inlet 220*a* for normal operation of the system 100 (i.e., the vapour-compression cycle).

Storage During Operation:

During operation of the system 100, based on one or more of the sensors 420, 440, 540, 540*a*, 540*b*, 540*c*, 540*d*, 580*a*, 580*b*, 600*a*, 600*b*, 620, ES1, ES2, the control system 160 is able to determine when the compressor 140 is generating more cooling capacity than required. In this event, the control system 160 configures the flow-directing assembly 380 into a storage flow configuration by actuating 400*b* to the first flow position. Simultaneously, the control system 160 configures the storage container 480 into a storage configuration by actuating the storage valve 520*a* to the open position. In addition, the control system 160 actuates the hydraulic valves 520*b* and 520*c* to the open positions. This causes refrigerant to be directed into the low pressure internal chamber 780. The piston 760 will retract to allow storage of the compressed and heated refrigerant from the compressor outlet 140*b*, and simultaneously hydraulic fluid will return to the hydraulic fluid tank H2 through the port 480*b* and through the hydraulic valve 520*c*.

Once the control system 160 determines that the optimal running capacity for the current load and conditions are met based on one or more of the sensors 420, 440, 540, 540*a*, 540*b*, 540*c*, 540*d*, 580*a*, 580*b*, 600*a*, 600*b*, 620, ES1, ES2, the control system 160 configures the flow-directing assembly 380 into the compressor-condenser configuration for normal operation of the system 100 as described above. Simultaneously, the control system 160 configures the storage assembly 460 into an isolation configuration by actuating the storage valve 520*a* to the closed position. In addition, the control system 160 actuates hydraulic valve 520*b* to the closed position.

The storage assembly 460 in the isolation configuration seals compressed refrigerant in the container 480. It will be appreciated that the compressed refrigerant stored in the container 480 will substantially maintain its thermal and pressure energy as the container 480 is vacuum insulated and the storage valve 520*a* and the hydraulic valve 520*b* are closed. It will also be appreciated that this 'storage during operation' can be performed multiple times in succession to continue to lower the cooling capacity of the system 100 (through a reduction in the system refrigerant) as required.

In this "storage during operation", the mechanical load from the compressor 140 is reduced while in the on-state through a reduction in the system refrigerant and therefore system pressures, thereby reducing unnecessary energy consumption.

Releasing During Operation:

During operation of the system 100, based on one or more of the sensors 420, 440, 540, 540*a*, 540*b*, 540*c*, 540*d*, 580*a*, 580*b*, 600*a*, 600*b*, 620, ES1, ES2, the control system 160 is able to determine when the capacity of the system 100 is too low and/or not optimal for the current conditions. In this event, the control system 160 actuates the hydraulic pump H1 to the on-state and the hydraulic valve 520*b* to the open position. In this state, the refrigerant in the internal chamber 780 of the container 480 is compressed until, based on one or more of the sensors 420, 440, 540, 540*a*, 540*b*, 540*c*, 540*d*, 580*a*, 580*b*, 600*a*, 600*b*, 620, ES1, ES2, the control system 160 determines that the stored refrigerant is at a higher pressure than the pressure at the compressor inlet 140*a*. Then, the control system 160 configures the storage assembly 460 into a releasing configuration by actuating the storage valve 520*a* to the open position. Simultaneously, the control system 160 actuates the suction valve 560 to the open position. In this releasing configuration of the storage assembly 460, the higher pressure refrigerant is released into the compressor inlet 140*a*. During this process, the hydraulic pump H1 maintains the pressure of the container 480 above the pressure of the compressor inlet 140*a*.

Once the control system 160 determines that the optimal running capacity for the current load and conditions are met based on one or more of the sensors 420, 440, 540, 540*a*, 540*b*, 540*c*, 540*d*, 580*a*, 580*b*, 600*a*, 600*b*, 620, ES1, ES2, the control system 100 configures the storage assembly 460 into the isolation configuration.

It will be appreciated that the system 100 will cycle between the "storage during operation" and "releasing during operation" phases such that the compressor 140 is able to run at its most optimal state.

Shutdown:

During operation of the system 100, based on one or more of the sensors 420, 440, 540, 540*a*, 540*b*, 540*c*, 540*d*, 580*a*, 580*b*, 600*a*, 600*b*, 620, ES1, ES2, the control system 160 is able to determine when the predetermined temperature has been reached in the inside area, or it is inefficient to continue running. In this event, the control system 160 configures: the flow-directing assembly 380 into the storage flow configuration; and the storage assembly 460 into the storing configuration. It will be appreciated that the compressed refrigerant stored in the container 480 will substantially maintain its thermal and pressure energy as the container 480 is vacuum insulated and the valves 520*a*, 520*b* remains closed once filled. It will be appreciated that the capturing of the gas through lowering the pressure of the container 480 below the compressor outlet 140*b* pressure will reduce the compressor energy usage during the storing phase.

Once one or more of the sensors 420, 440, 540, 540*a*, 540*b*, 540*c*, 540*d*, 580*a*, 580*b*, 600*a*, 600*b*, 620, ES1, ES2 indicates to the control system 160 that the system 100 is approaching a pressure set point, the control system 160 actuates the compressor 140 to the off-state, configures the storage assembly 460 into the isolation configuration and configures the flow-directing assembly 380 into a no-flow configuration by actuating the flow valve 400*b* to the closed position.

Once the storage assembly 460 is in the isolation configuration and the flow-directing assembly 380 is in the no-flow configuration, the control system 160 actuates the suction valve 560 to the open position and the flow-directing assembly 380 to the storage configuration in order to relieve pressure from the compressor head. Once the sensor 420 indicates that the pressure has been relieved, the control system 160 actuates the suction valve 560 to the closed position and the flow-directing assembly 380 to the no-flow configuration.

Startup:

From shutdown, when the temperature rises above the predetermined temperature in the inside area and the compressor 140 is required for the vapour compression system to generate cooling capacity, the control system 160 configures the flow-directing assembly 380 into a storage-compressor flow configuration by actuating the flow valve 400b to the third flow position. Simultaneously, the control system 160 actuates the hydraulic pump H1 to the on-state, the control valve 520b to the open position, and the hydraulic valve 520c to the closed position. The flow-directing assembly 380 in the storage-compressor flow configuration allows refrigerant to flow from the flow port 380c to the condenser inlet 220a via the flow port 380b. Further, the control system 160 configures the storage assembly 460 into a pressure-balancing configuration by actuating the storage valve 520a to the open position. Simultaneously, the control system 160 actuates the suction valve 560 to the closed position. The storage assembly 460 in the pressure-balancing configuration releases compressed refrigerant stored in the container 480 to flow through the storage port 460a, the flow port 380c, and the flow port 380b to the condenser inlet 220a.

Once the control system 160 determines based on one or more of the sensors 420, 440, 540, 540a, 540b, 540c, 540d, 580a, 580b, 600a, 600b, 620, ES1, ES2 that the system 100 is ready to restart, the control system 160 actuates the compressor 140 to the on-state. During the pressure-balancing process the control system 160 actuates the hydraulic pump H1, the hydraulic valve 520b and the hydraulic valve 520c to maintain the stored refrigerant pressure above the compressor outlet 140a pressure. The control system 160 may also choose based on one or more of the sensors 420, 440, 540, 540a, 540b, 540c, 540d, 580a, 580b, 600a, 600b, 620, ES1, ES2 to configure the flow directing assembly 380 to the compressor-condenser flow configuration, and actuate the suction valve 560 to the open position to release the stored refrigerant into the compressor inlet 140a.

Once the control system 160 has determined based on one or more of the sensors 420, 440, 540, 540a, 540b, 540c, 540d, 580a, 580b, 600a, 600b, 620, ES1, ES2 that the container 480 has released the required stored refrigerant, the control system 160 configures the storage assembly 460 into the isolation configuration and actuates the suction valve 560 to the closed position and the flow directing valve 400b to the compressor-condenser configuration.

In another embodiment, the expansion valve 300 has an orifice with an adjustable size. In this embodiment, the system 100 further includes an orifice sensor which is located in the expansion valve 300 and configured to measure the size of the orifice. The control system 160 is electrically connected to the orifice of the expansion valve 300 and able to adjust the size of the orifice of the expansion valve 300 based on the orifice sensor and/or one or more of the sensors 420, 440, 540, 540a, 540b, 540c, 540d, 580a, 580b, 600a, 600b, 620, ES1, ES2 during operation of the system 100. It will be appreciated that the adjustment in the size of the orifice of the expansion valve 300 will adjust the expansion of the refrigerant passing therethrough and may facilitate refrigerant flow during any of the above phases of the operation (e.g., the "startup" phase, the "storage during operation" phase etc).

In this "startup" phase, the system 100 arrives at optimal temperature and pressure faster due to the introduction of the stored thermal and pressure energy and thereby reduces the running time required by the compressor 140 to achieve the required cooling capacity. The storage and release of otherwise wasted thermal and pressure energy developed by the compressor 140 during shutdown/startup phase cycles therefore saves energy. Further, optimization of the start procedure allows the compressor to actuate to the on state with less energy usage through decreasing the gas in the circuit, pressurizing the suction side of the compressor 140 with the released refrigerant, or initiating the flow of refrigerant in the circuit at startup.

An advantage of the system 100 is that cooling capacity of the system 100 can be actively modified whilst it is operating, optimizing energy usage based on the required capacity, whilst still able to shut down when this is the most efficient option.

The system 100 described above can be provided as a new installation. Alternatively, installing the subsystem (i.e., at least the flow-directing assembly 380, the storage assembly 460, and control system 160) to an existing vapour-compression system by way of a retrofit can form an equivalent system. Such a retrofitted vapour-compression system will provide similar advantages as described above.

Although the invention has been described with reference to preferred embodiments, it will be appreciated by a person skilled in the art that the invention may be embodied in many other forms. For example, in another embodiment, the vapour-compression systems 10, 100 may be in the form of a refrigeration system. Further, in another embodiment, the compressors 14, 140 may be variable speed compressors. Still further, in another embodiment, the flow-directing assembly 38, 380 may be fluidly connected at other locations of a vapour-compression circuit (e.g., between the condenser and the evaporator, or between the evaporator and the compressor) and perform a similar operation as described above.

The invention claimed is:

1. A subsystem for a vapour-compression system, the subsystem including:
    a storage assembly comprising a container with an internal chamber for storing refrigerant; and
    a flow-directing assembly in fluid communication with the storage assembly,
    wherein the flow-directing assembly is configured to direct refrigerant from the vapour-compression system to the storage assembly for storage in the internal chamber,
    wherein the storage assembly is configured to adjust the volume of the internal chamber, and
    wherein the storage assembly is further configured to release refrigerant stored in the internal chamber into the vapour-compression system.

2. The subsystem according to claim 1, wherein the container is vacuum insulated.

3. The subsystem according to claim 1, wherein the internal chamber is substantially defined by a wall, a first end and a second end, wherein the first end is moveable relative to the second end.

4. The subsystem according to claim 3, wherein the storage assembly further comprises a motor operatively connected with the first end to move the first end relative to the second end.

5. The subsystem according to claim 3, wherein the storage assembly further comprises a hydraulic system configured to move the first end relative to the second end.

6. The subsystem according to claim 3, wherein the first end comprises a piston sealingly engaged with the wall.

7. In combination, the subsystem of claim 1 and the vapour-compression system, wherein the flow-directing assembly and the storage assembly are in fluid communication with the vapour-compression system.

8. The combination according to claim 7, wherein the vapour-compression system comprises a compressor which is in an on-state when the flow-directing assembly directs refrigerant from the vapour-compression system to the storage assembly and/or when the storage assembly releases refrigerant stored in the internal chamber into the vapour-compression system.

9. The combination according to claim 7, wherein the vapour-compression system comprises a compressor which is in an off-state when the storage assembly releases refrigerant stored in the internal chamber into the vapour-compression system.

10. In combination, the subsystem of claim 6 and the vapour-compression system, wherein the flow-directing assembly and the storage assembly are in fluid communication with the vapour-compression system.

11. The combination according to claim 10, wherein the vapour-compression system comprises a compressor which is in an on-state when the flow-directing assembly directs refrigerant from the vapour-compression system to the storage assembly and/or when the storage assembly releases refrigerant stored in the internal chamber into the vapour-compression system.

12. The combination according to claim 11, wherein the vapour-compression system comprises a compressor which is in an off-state when the storage assembly releases refrigerant stored in the internal chamber into the vapour-compression system.

* * * * *